(12) United States Patent
Drake

(10) Patent No.: US 8,724,490 B2
(45) Date of Patent: May 13, 2014

(54) ZIGBEE IP/6LOWPAN ROUTER

(75) Inventor: Jeff Donald Drake, Louisville, KY (US)

(73) Assignee: General Electric Company, Schenectady, NY (US)

(*) Notice: Subject to any disclaimer, the term of this patent is extended or adjusted under 35 U.S.C. 154(b) by 84 days.

(21) Appl. No.: 12/909,469

(22) Filed: Oct. 21, 2010

(65) Prior Publication Data
US 2012/0063334 A1 Mar. 15, 2012

(51) Int. Cl.
*H04L 12/26* (2006.01)
*H04L 12/28* (2006.01)
*H04J 3/26* (2006.01)
*H04J 3/16* (2006.01)
*G06F 15/173* (2006.01)
*G05D 3/12* (2006.01)
*G05D 23/00* (2006.01)

(52) U.S. Cl.
USPC ........... 370/252; 370/392; 370/432; 370/467; 709/224; 700/295; 700/300

(58) Field of Classification Search
CPC ...................................................... H04L 47/10
USPC .............................. 700/295; 709/224; 370/467
See application file for complete search history.

(56) References Cited

U.S. PATENT DOCUMENTS

| | | | |
|---|---|---|---|
| 7,464,157 B2 * | 12/2008 | Okude et al. ................... | 709/224 |
| 2006/0268920 A1 * | 11/2006 | Venkatachalapathy ....... | 370/432 |
| 2008/0056301 A1 * | 3/2008 | Higuchi et al. ............... | 370/467 |
| 2009/0073983 A1 * | 3/2009 | Kim .............................. | 370/392 |
| 2010/0262313 A1 * | 10/2010 | Chambers et al. ............ | 700/295 |
| 2011/0015802 A1 * | 1/2011 | Imes ............................. | 700/300 |
| 2011/0118890 A1 * | 5/2011 | Parsons ........................ | 700/295 |

\* cited by examiner

*Primary Examiner* — Ian N Moore
*Assistant Examiner* — Kiet Tang
(74) *Attorney, Agent, or Firm* — Global Patent Operation; Marc A. Vivenzio

(57) ABSTRACT

A system and method for managing energy of a home or other structure are disclosed. An energy management system for a home network comprises a central device controller configured to communicate with energy consuming devices, energy generation devices and storage devices at a home. Power/energy measuring devices provide consumption measurements for the home and each device to the controller. A home network router routes communications among various networks for the home. The router provides for a 6LowPan/Zigbee network to communicate with WiFi, Ethernet and the like networked devices of the home.

20 Claims, 3 Drawing Sheets

ZIGBEE IP/6LOWPAN ROUTER

BACKGROUND

This disclosure relates to energy management, and more particularly to energy systems and methods with time of use (TOU) and/or demand response (DR) energy programs. The disclosure finds particular application to utility systems and appliances configured to manage energy loads to consumers through a communicating consumer control device, such as a home energy manager (HEM), programmable communicating thermostat (PCT), appliance controller, or the like.

Many utilities are currently experiencing a shortage of electric generating capacity due to increasing consumer demand for electricity. Currently utilities charge a flat rate, but with increasing cost of fuel prices and high energy usage at certain parts of the day, utilities have to buy more energy to supply customers during peak demand. If peak demand can be lowered, then a potential huge cost savings can be achieved and the peak load that the utility has to accommodate is lessened. In order to reduce high peak power demand, many utilities have instituted time of use (TOU) metering and rates which include higher rates for energy usage during on-peak times and lower rates for energy usage during off-peak times. As a result, consumers are provided with an incentive to use electricity at off-peak times rather than on-peak times and to reduce overall energy consumption of appliances at all times.

Presently, to take advantage of the lower cost of electricity during off-peak times, a user must manually operate power consuming devices during the off-peak times. However, a consumer may not always be present in the home to operate the devices during off-peak hours. In addition, the consumer may be required to manually track the current time to determine what hours are off-peak and on-peak.

There is a need to provide a system that can automatically operate power consuming devices during off-peak hours in order to reduce consumer's electric bills and also to reduce the load on generating plants during on-peak hours while enabling communication among different types of appliances and the utility network. Active and real time communication of energy costs of appliances to the consumer will enable informed choices of operating the power consuming functions of the appliance.

SUMMARY

The present disclosure enables energy consuming devices of a home network to route communications among devices and the central controller in the home network as well as external networks with an internet protocol address.

In one embodiment, an energy management system for a home network comprising managed energy consuming devices respectively drawing different amounts of power in a home is provided. The energy management system is a home energy manager system comprising a central controller or central device controller with a memory. The controller is in communication with the managed energy consuming devices that respectively comprise a device controller. A router having at least two communication modules and a routing engine within the network routes communications at the home network to devices in which the communications are addressed for. At least one power/energy measuring device is in communication with the controller and the managed devices and configured to provide a total energy/power consumption measurement for the home and a power/energy consumption measurement for each managed device. The central controller has a processor and at least one transceiver and is configured to monitor and control energy consumption of each of the managed devices and respective components thereof by sending communications to each of the managed devices via the router and to a device controller of an energy consuming device or appliance respectively.

DETAILED DESCRIPTION

A home area network router comprises multiple wireless and wired transceivers, which communicate in various formatted protocols. The home area network router integrates devices communicating in these various protocols through one portal in the home network. A central controller (e.g., a home energy gateway) of an energy management system is communicatively coupled to the home area network router and provides homeowners the means to monitor and manage their energy consumption through a combination of behavior modification and programmed control logic. The central controller provides feedback on energy consumption, and storage of energy at the home, which may be presented to a user via a web browser on the homeowner's networked personal computer, mobile device, or any other client device in a client interface.

The energy management system having the home network router is further designed to integrate with the electrical utilities' push towards Demand Side Management (DSM), also known as Demand Response (DR). The central device is capable of receiving electricity rates and schedules from the utility and using that information to implement pre-determined load shedding behavior across the whole home electrical load via the home area network router, as will be further appreciated below.

The home network router is designed to accommodate multiple methods of wireless communication. This enables the central device to talk to radio modules of devices within the home network by router communications among them. The central device operatively coupled to the router therefore has the following wireless capability: 802.11 WiFi, FM receiver, and 802.15.4 compliant "Zigbee" radios and 802.3 Ethernet capabilities.

Figure 1:
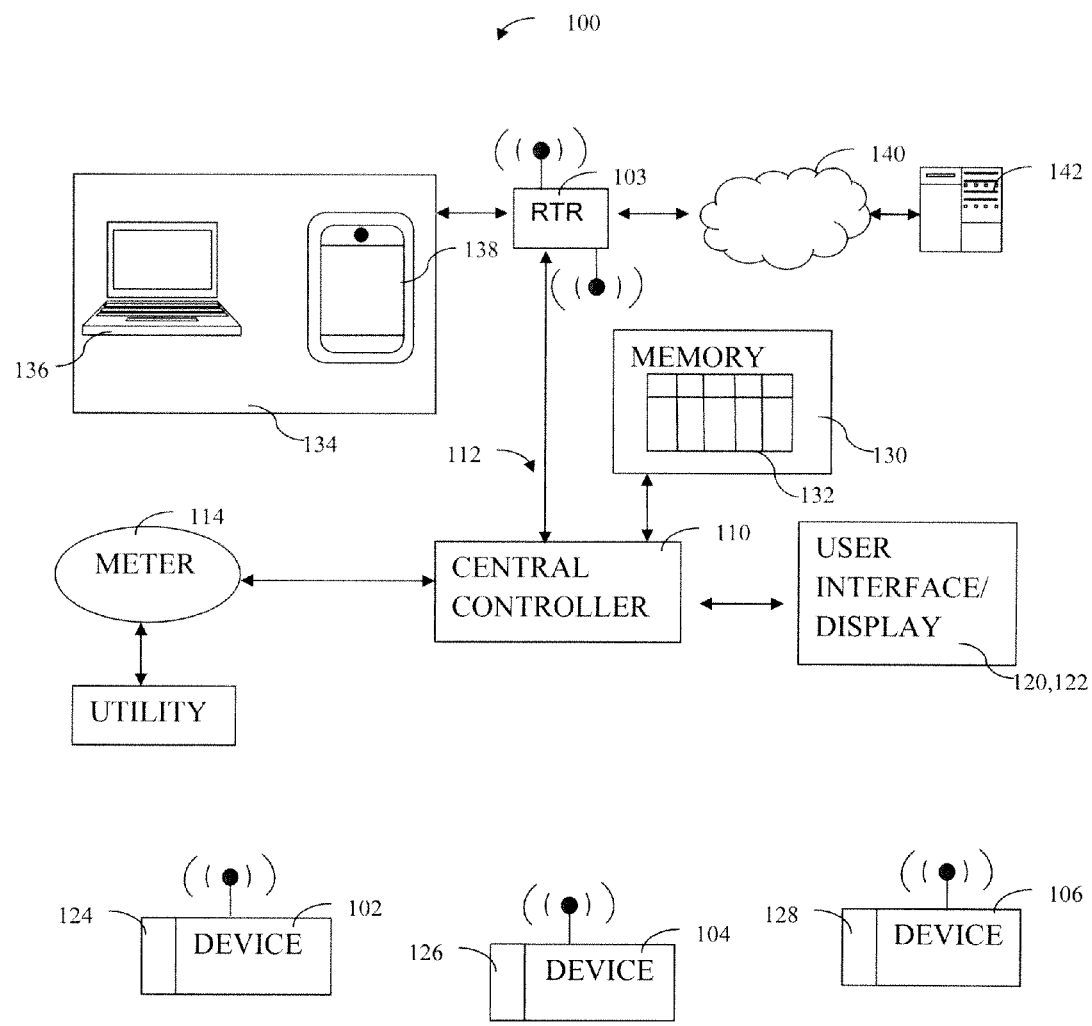
FIG. 1 is a schematic illustration of an energy management system.

FIG. 1 schematically illustrates an exemplary home energy management system 100 for one or more energy consuming devices, such as devices 102, 104, 106 according to one aspect of the present disclosure. Each of the devices 102, 104, 106 can comprise one or more power consuming features/functions. For example, device 104 can be a refrigerator, an HVAC system, and/or any energy consuming device capable of having power consumption measured thereat. The devices may also be controllers, or other energy consuming devices other than appliances. The home energy management system 100 generally comprises a central device or central controller 110 for managing power consumption within a household. The controller 110 is operatively connected to each of the power consuming features/functions. The controller 110 is coupled to a home network router 103, which is configured to selectively route communications to and from a device control board 124, 126, 128 of device 102, 104, and/or 106 respectively in response to the input signal it receives. The device controller, in turn, is operable to manipulate energizing of the power consuming features/functions thereof.

The controller 110 is configured to receive a communication signal via the home network router 103 and then process the signal. The signal may be a DR signal indicative of one or more energy parameters and/or a utility state of an associated energy supplying utility and/or from energy consuming devices within the home network. There are several ways to accomplish this communication, including but not limited to WiFi 802.11, 6LowPan/ZigBee 802.15, Ethernet 802.3, 802.11, 802.15.4, etc.

The controller 110 is configured to communicate to the devices 102, 104, 106 in one of a plurality of operating modes, including at least a normal operating mode and an energy savings mode in response to the received DR signal. Specifically, each appliance 102, 104, 106 can be operated in the normal operating mode during the off-peak demand state or period and can be operated in the energy savings mode during the peak demand state or period. The controller 110 is able to communicate via the router 103 in various communication formats in internet protocol, such as an ipv6 IP address. As a result, devices of multiple types can communicate within the home network.

In one embodiment, the home network router 103 joins a Zigbee IP or 6LowPan network as an edge router, for example. The router 103 is operable to transform the 6LowPan/Zigbee IP internet protocol address to an ipv6 address format. In addition, the router 103 operates as a WiFi router/access point and is able to host other WiFi devices and/or further operates as a local Ethernet router in order to host Ethernet devices on the network too.

As will be discussed in greater detail below, the controller 110 is configured to communicate with each device and/or appliances through the router 103, and thus is able to precipitate the return of the devices to the normal operating mode after the peak demand period is over regardless if the devices vary in communication protocol, for example. If the controller 110 receives and processes an energy signal indicative of a peak demand state or period at any time during operation of the appliances 102, 104, 106, the controller makes a determination of whether one or more of the power consuming features/functions of each appliance should be operated in the energy savings mode and if so, it signals the appropriate features/functions of each appliance to begin operating in the energy savings mode via the home network router 103 in order to reduce the instantaneous amount of energy being consumed by the appliances.

The device controller 110 is the central brain for the entire system. It contains an optional user display 120 with a user interface 122 coupled thereto that may be used for displaying current energy consumption, historical energy consumption, thermostat set points and schedule, a 7-day weather forecast, or the like. The controller 110 communicates to the router via an Ethernet interface 112 and to sensor radios of appliances via one or more wireless radios. The interface radios are Zigbee (802.15.4) at 114, WiFi (802.11) at 116, and an eRadio FM receiver 118. The controller can also communicate to devices via a wired connection and the like. The controller 110 can include USB ports for adding additional functionality.

In one embodiment, the controller 110 connects via either Ethernet or WiFi to the homeowner's router 103 and to a client application 134 in a personal computer 136 and/or a mobile device 138 to access the Internet 140 of FIG. 1. This allows for remote service and monitoring capability with the ability to communicate to devices on the network with various different protocols (e.g., 6LowPan/Zigbee, Ethernet, WiFi, etc.). A server 142 can keep records of the home that may be accessed remotely via the internet.

In another embodiment, the home can be outfitted with a "smart" electric meter as the meter 144 or other meters in the system, for example. This meter wirelessly communicates directly with the central device controller 110 or to other devices of the home via the home network router 103. The home's "smart" meter can be configured to output a communication signal based on electrical consumption. In another embodiment, the electric utility can directly send the consumption data to the central controller 110 via the Internet 140, rather than the meter.

As stated above, local utility and rate information is also broadcast from the utility or energy provider to the controller 110 directly. The controller 110 can receive rate and schedule information as well as demand side management DSM signals to communicate them to the household appliances via the router 103. The devices within the network may also transmit energy/power consumption data or other like data to the central controller 110. The central controller 110 can provide home data through an application programming interface, such as for a web based application or application on a client device that is communicated through the home area network router 103 to the various energy consuming devices within the home network or to other client devices communicatively coupled thereto. The central device 110 may therefore operate as a data server for providing data, such as in a client application, for example, which in turn can be used to present the data to the consumer client. The data may be presented in the form of a graph with data of historical/present energy usage, generation and/or storage data therein.

Figure 2:
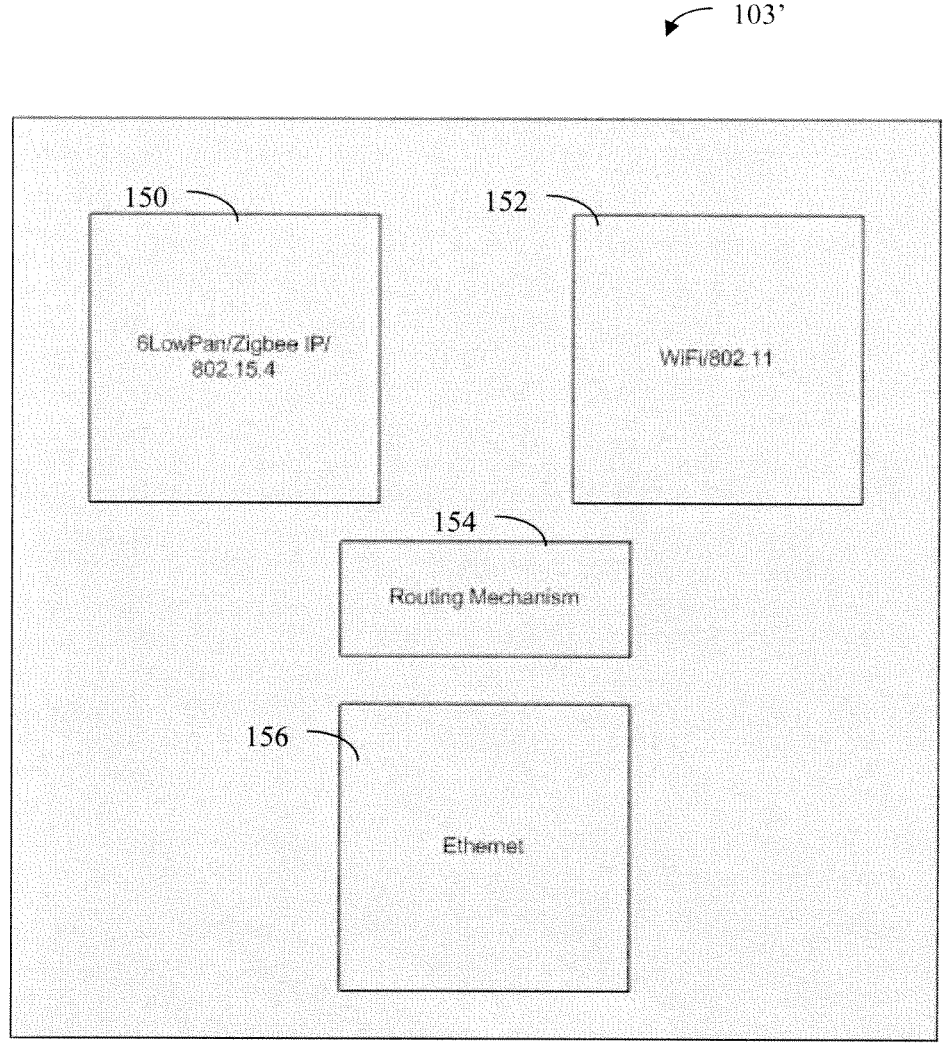
FIG. 2 is a schematic diagram of a routing device of the present disclosure.

Referring to FIG. 2, a system block diagram of a home network router 103' is illustrated. The router 103' comprises multiple communication modules that facilitate communication between devices of the HAN, central controllers, and/or energy providers over an internet protocol. The router 103' joins networks within the home and sends communications to operate internet gateway addresses.

One of ordinary skill in the art will appreciate the mechanics of a router, which is an electronic device that interconnects two or more computer networks, and selectively interchanges packets of data between them. Each data packet contains address information that a router can use to determine if the source and destination are on the same network, or if the data packet must be transferred from one network to another. How a data packet is transformed is appreciated by one of ordinary skill in the art will and is not fully described in detail herein.

In one embodiment, the home network router 103' illustrated in FIG. 2 is operable as a 6LowPan/Zigbee IP/802.15.4 edge router in an energy management system, such as system 100 discussed above or other like system. The router 103' includes at least two communication modules. For example, a first communication module 150 of the router 103' is a 6LowPan/Zigbee IP communication module and a second communication 152 is a WiFi/802.11 communication module. The first communication module 150 and the second communication module 152 are operatively coupled to a routing engine mechanism 154 that processes data received and interchanges communication between at least two networks.

The first communication module 150 communicates data in a Zigbee IP/6LowPan network and forwards the communicated data to the routing engine 154 for processing and routing data to other networks and devices of different and/or the same address format. Any time a node, for example, in the Zigbee IP/LowPan network attempts to send communication packet (e.g., a datagram) at an address outside the Zigbee IP/LowPan network, the routing engine 154 recognizes this action because the Internet Protocol (IP) address prefix of the communication will be a value that is not consistent with the Zigbee IP/LowPan communicating devices linked on the Zigbee/6LowPan network. When the router 103' receives such a communication packet via first communication link, such as a datagram with an inconsistent value in the address, the routing engine 154 unwraps the link local MAC/PHY data of the packet and evaluates the IP destination address.

The router 103' includes a memory (not shown) that stores a list of IP addresses/subnet mask of all other devices that are communicatively coupled to the router over different links, i.e., WiFi, Ethernet, etc. Communication is facilitated with the second communication module and/or a third communication module 156, which may be different type of module than the second communication module 152. If the IP address of a communication packet from a network (e.g., Zigbee/6LowPan, WiFi, Ethernet, etc.) of the home is equal to one of the devices connected to it or part of this subnet, then the router 103' will then package the data into the proper link format, form an ipv6 header, and transmit the communication to the proper device accordingly.

The router 103' with the routing engine 154 recognizes the IP prefix in communication packets for the Zigbee IP/LowPan network. When receiving communications (e.g., datagrams or the like) on any of the other communication links with destination addresses to one of these addresses, the router 103' will forward the communication to the Zigbee IP/LowPan network. Thus, the router 103' provides many different common links, such as WiFi, Ethernet and/or the like, that can communicate directly via the router to Zigbee IP/6LowPan devices. This provides an advantage of eliminating the need for gateways/bridges between various networks and devices.

In one embodiment, the third communication module 156 is an optional module that includes an Ethernet interface for communicating between personal computer or other devices on an Ethernet network communicating with Ethernet protocol formats. The second module and third module are not limited to any particular communication with addresses of any one particular format and can be of other formats other than WiFi and/or Ethernet format. For example, the router 103' allows a user or homeowner to join any type of device, such as a WiFi, Ethernet, or Zigbee IP/6LowPan device and the like. Where each device communicates via an internet protocol via the router 103' with one another.

Figure 3:
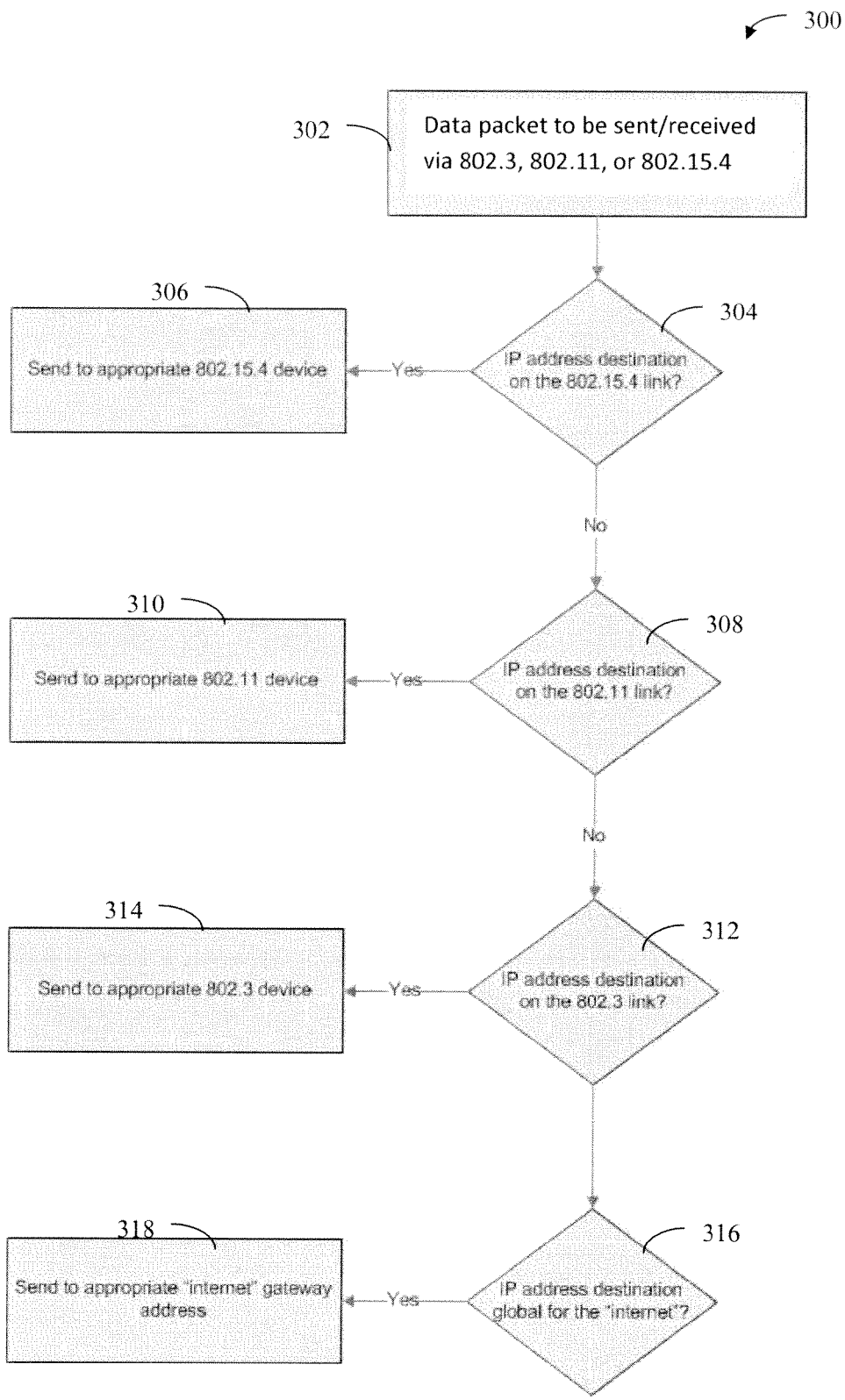
FIG. 3 is a flow diagram of a method for routing device communication messages over a home area network.

FIG. 3 illustrates an exemplary method 300 for routing communication messages in 6LowPan/Zigbee IP protocol format. While the method 300 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 300 begins at 302 where the router 103, 103' receives a communication data packet from a WiFi, Ethernet, Zigbee/6LowPan format or an internet protocol format. At 304 a processing engine of the router determines what communication link to transmit the message to for further transmission from a communication module of the router. For example, the engine questions if the IP destination address is on an 802.15.4 link. If the address is addressed for this link, then at 306 the data packet is forwarded to the appropriate communication module and sent to the appropriate 802.15.4 device on that network. The communication module can be a wireless transceiver or a wired interface, for example.

If the decision at 304 is not positive, then the engine determines at 308 whether the IP destination address is on the 802.11 link. If the address is addressed for this particular link, then at 310 the data packet is forwarded to the appropriate communication module and sent to the appropriate 802.11 device on that network. If the decision at 308 is not positive, then the engine determines at 312 whether the IP destination address of the communication packet I son the 802.3 link. If the decision is positive, then at 314 the packet is forward to the appropriate communication module of the router and sent to the appropriate 802.3 device on that network. The flow continues at 316 if the decision at 312 is negative. At 318, if the address is an IP destination address for the global internet, then the packet is forwarded to the appropriate internet gateway address.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An energy management system for a home network comprising managed energy consuming devices respectively drawing different amounts of power in a home, comprising:
   a central controller located in the home and having a memory and at least one transceiver in communication with the managed energy consuming devices that respectively comprise a device controller;
   a home network router communicatively coupled to the central controller and comprising at least two wireless communication modules configured to communicate using at least two different wireless communication protocols that facilitate communication among the managed energy consuming devices and the central controller; and
   at least one power/energy measuring device in communication with the central controller and the managed energy consuming devices via the home network router and configured to provide a total energy/power consumption measurement for the home and power/energy consumption measurement for each of the managed energy consuming devices;
   wherein the home network router comprises
      a memory having a table of IP Address/subnet masks of other devices located in the home and communicatively coupled to the home network router over different WiFi, Ethernet, and Zigbee IP/6LowPan links; and
      a routing engine configured to recognize datagrams destined for Zigbee IP/6LowPan devices based on datagram IP prefix; and
   wherein the central controller is configured to monitor and communicate energy consumption of each of the managed energy consuming devices and respective components thereof by sending communications to each of the managed energy consuming devices via the device controller respectively and to provide real time feedback to a user interface display.

2. The system of claim 1, wherein the at least two communication modules comprise a first wireless transceiver radio that is a 6LowPan/Zigbee IP/802.15.4 wireless transceiver, and a second wireless transceiver radio that is a WiFi transceiver that communicates via a WiFi protocol or an Ethernet interface that is configured to communicate via an Ethernet protocol with managed energy consuming devices of the home network and/or the central controller.

3. The system of claim 2, wherein the home network router comprises a third communication module that is the WiFi transceiver if the second communication module is the Ethernet interface, or the Ethernet interface if the second communication module is the WiFi transceiver.

4. The system of claim 3, wherein the home network router comprises a routing engine operatively connected to each communication module that processes signals from each communication module and processes them in a different protocol format to communicate with each of the managed energy consumption devices and the central controller operatively connected thereto.

5. The system of claim 4, wherein the managed energy consumption devices and the central controller communicate via different internet protocol formats with the home network router at the respective communication module.

6. The system of claim 4, wherein the internet protocol address format is an ipv6 address for communicating communications signals among the managed energy consumption devices and the central controller respectively having communication signals of different protocol formats including at least a 6LowPan/Zigbee IP communication signal, a WiFi communication signal, and an Ethernet communication signal.

7. The system of claim wherein the home network router includes a routing engine that is configured to transform a 6LowPan/Zigbee IP address to a different protocol address format including an Ethernet address and a WiFi address and communicate the different protocol address to the second and third communication module accordingly,
wherein the routing engine is configured to transform a WiFi address to a second different protocol address format including the 6LowPan/Zigbee IP address and an Ethernet address and communicate the second different protocol address format to the first, second and/or third communication module accordingly,
wherein the routing engine is configured to transform the Ethernet address to a third different internet protocol address format including the WiFi address and the 6LowPan/Zigbee IP address and communicate the third different internet protocol address to the first, second and/or third communication module accordingly.

8. The system of claim 1, the managed energy consuming devices comprising:
a first managed energy consuming device comprising a 6LowPan/Zigbee IP/802.15.4 wireless transceiver that communicates to the router and all other devices on the home network via the router;
a second managed energy consuming device comprising a WiFi wireless transceiver that communicates to the router and all other devices on the home network via the router; and
a third managed energy consuming device comprising an Ethernet interface that communicates to the router and all other devices on the home network via the router.

9. A non-transitory machine readable medium in a home network router having instructions recorded thereon that, when read by a computer, cause the computer to:
create a table of IP Address/subnet masks of other devices located in the home and communicatively coupled to the home network router over different WiFi, Ethernet, and Zigbee IP/6LowPan links;
recognize datagrams, via a routing engine, destined for Zigbee IP/6LowPan devices based on datagram IP prefix;
the home network router communicatively coupled to a central controller and comprising at least two wireless communication modules configured to communicate using at least two different wireless communication protocols that facilitate communication among at least two managed energy consuming devices and the central controller;
the home network router configured to communicate, using a first communication module and a 6LowPan/Zigbee IP format, via a first communication link coupled to at least one of the energy consuming devices;
communicate, using a second communication module, with the first communication module and with at least one different energy consuming device in a different wireless protocol format than 6LowPan/Zigbee IP to communicate messages from the first communication module to the different energy consuming device; and
route, using the routing engine, communication between the first communication module and the second communication module for the energy consuming devices to communicate among one another, the central controller and a metering device of the home network.

10. The non-transitory machine readable medium of claim 9 wherein the first communication module comprises a wireless transceiver radio that communicates in the 6LowPan/Zigbee IP format and an ipv6 format.

11. The non-transitory machine readable medium of claim 9, wherein the instructions cause the second communication modules to communicate in a WiFi protocol format with an ipv6 address.

12. The non-transitory machine readable medium of claim 9, further the instructions cause a wireless transceiver of the third communications module to communicate in a WiFi format and ipv6 format, wherein the second communication module comprises a wireless transceiver radio that communicates in an Ethernet format.

13. The non-transitory machine readable medium of claim 12, wherein the instructions cause the routing engine to transform the messages of 6LowPan/Zigbee IP format to a different protocol address format comprising an Ethernet format and a WiFi format and communicate the message of the different protocol address format to the second and third communication module accordingly.

14. The non-transitory machine readable medium of claim 12, wherein the instructions cause the routing engine to transform the messages in the WiFi format to a second different protocol address format comprising the 6LowPan/Zigbee IP format and the Ethernet format and communicate the second different protocol address format to the first, second and/or third communication module accordingly.

15. The non-transitory machine readable medium of claim 12, wherein the instructions cause the routing engine to transform the Ethernet address to a third different protocol address format comprising the WiFi format and the 6LowPan/Zigbee IP format and communicate messages in the third different protocol address format to the first, second and/or third communication module accordingly.

16. A method for routing communication messages, the method comprising:
at a home network comprising a plurality of energy consuming devices and a router,
wherein the energy consuming devices are configured to communicate using a plurality of wireless protocols, and
wherein the router is configured to (i) host Ethernet devices communicating using an 802.3 address format, (ii) host WiFi devices communicating using an 802.11 address format, and (iii) host 6LowPan/ZigBee devices communicating using an 802.15.4 address format by transforming IP 802.15.4 address formats to an IPv6 address format;

receiving a data packet of a format comprising 802.3, 802.11, 802.15.4 or internet protocol format;

determining a communication link coupled to a communication module to send the data packet to;

forwarding the data packet to the communication module; and sending the data packet to at least one device comprising an 802.15.4 device, an 802.11 device, an 802.3 device and/or an internet gateway address depending upon which address the data packet is formatted, wherein the determining comprises at least (i) comparing a table resident in a memory of the router, the table having a list of IP Address/subnet masks of other devices located in the home and communicatively coupled to the router over different WiFi, Ethernet, and Zigbee IP/6LowPan links; and (ii) recognizing, using a routing engine of the router to recognize datagrams destined for Zigbee IP/6LowPan devices based on datagram IP prefix; and wherein the plurality of energy consuming devices communicate in the home network by sending messages to the router for routing data packets therebetween.

17. The method of claim 16, further comprising:

upon receiving a data packet that is outside of a 802.15 network address, unwrapping a local MAC/PHY data and evaluating a destination IP address;

if the IP address of the data packet from the 802.15 network is equal to one of the devices connected to it, packaging the data into a proper link format, and form an ipv6 header so that the data packet is in form to be sent to at least one device in the home network.

18. The method of claim 16, further comprising:

upon receiving a data packet that is outside of a 802.11 network address, unwrapping a local MAC/PHY data and evaluating a destination IP address;

if the IP address of the data packet from the 802.11 network is equal to one of the devices connected to it, packaging the data into a proper link format, and attaching an ipv6 header so that the data packet is in form to be sent to at least one device of the home network.

19. The method of claim 16, further comprising:

upon receiving a data packet that is outside of a 802.3 network address, unwrapping a local MAC/PHY data and evaluating a destination IP address;

if the IP address of the data packet from the 802.3 network is equal to one of the devices connected to it packaging the data into a proper link format, and attaching an ipv6 header so that the data packet is in form to be sent to at least one device of the home network.

20. The method of claim 16, wherein the router is further configured to (iv) wirelessly route FM communication into the home network using an eRadio FM wireless radio receiver.

* * * * *

UNITED STATES PATENT AND TRADEMARK OFFICE
CERTIFICATE OF CORRECTION

| | | |
|---|---|---|
| PATENT NO. | : 8,724,490 B2 | Page 1 of 1 |
| APPLICATION NO. | : 12/909469 | |
| DATED | : May 13, 2014 | |
| INVENTOR(S) | : Drake | |

It is certified that error appears in the above-identified patent and that said Letters Patent is hereby corrected as shown below:

In the Claims

In Column 6, Line 46, in Claim 1, delete "comprises" and insert -- comprises: --, therefor.

In Column 7, Line 27, in Claim 7, delete "claim" and insert -- claim 1, --, therefor.

In Column 8, Line 24, in Claim 10, delete "9 wherein" and insert -- 9, wherein --, therefor.

In Column 10, Line 20, in Claim 19, delete "to it" and insert -- to it, --, therefor.

Signed and Sealed this
Eleventh Day of November, 2014

Michelle K. Lee
*Deputy Director of the United States Patent and Trademark Office*